United States Patent [19]
Bakule et al.

[11] 3,804,668
[45] Apr. 16, 1974

[54] ELECTROCONDUCTIVE PAPER

[75] Inventors: Ronald D. Bakule, Jenkintown;
Robert A. Gill, Abington; William D. Emmons, Huntington Valley, all of Pa.

[73] Assignee: Rohm and Haas Company, Philadelphia, Pa.

[22] Filed: Mar. 30, 1972

[21] Appl. No.: 239,771

[52] U.S. Cl............ 117/201, 96/1.5, 96/1.8, 117/155 UA, 162/138
[51] Int. Cl............ G03g 7/00, B44d 1/00
[58] Field of Search...... 117/201, 155 UA; 162/138; 96/1.5, 1.6, 1.8

[56] References Cited
UNITED STATES PATENTS

| | | | |
|---|---|---|---|
| 3,617,372 | 11/1971 | McNamee et al. | 117/201 |
| 3,702,799 | 11/1972 | Lewis et al. | 162/138 |
| 2,838,397 | 6/1958 | Gruntfest et al. | 162/168 |
| 3,689,468 | 9/1972 | Cenci et al. | 260/86.1 |
| 3,544,318 | 12/1970 | Boothe et al. | 117/201 |

Primary Examiner—Daniel J. Fritsch
Attorney, Agent, or Firm—Terence P. Strobaugh

[57] ABSTRACT

An electroconductive paper useful in electrostatic image reproduction techniques containing a polymer comprising units of the formula:

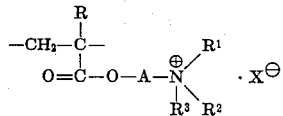

wherein
R is H or $CH_3$,
A is a $(C_2-C_3)$alkylene group,
$R^1$ is a hydroxyethyl or hydroxypropyl group,
$R^2$ is a $(C_1-C_4)$alkyl group
$R^3$ is a $(C_1-C_4)$alkyl group, and
$X^\ominus$ is an anion selected from acetate, formate, lactate, propionate and glycolate anions.

3 Claims, No Drawings

ELECTROCONDUCTIVE PAPER

DESCRIPTION OF THE INVENTION

McNamee et al. U.S. Pat. No. 3,617,372 discloses and claims electroconductive materials, such as papers, for electrostatic or related reproduction systems for copying printed documents. This patent briefly mentions various patents and publications concerning these types of copying procedures and points out certain advantages of reproductive papers or the like which contain, as a conductivity aid, a linear, water-soluble polymer having a molecular weight sufficient to form a self-supporting film of about one-half to 2 microns thickness, when dried from an aqueous solution, and having repeating units of the formula:

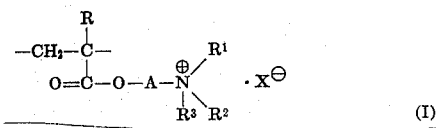

(I)

wherein
X is halogen,
R is H or methyl,
A is a $(C_2-C_3)$-alkylene group,
$R^1$ is a hydroxyethyl or hydroxypropyl group,
$R^2$ is a $(C_1-C_4)$-alkyl group, and
$R^3$ is a $(C_1-C_4)$-alkyl group.

In accordance with the present invention, it has been found that the replacement of the halogen ion with an anion selected from acetate, lactate, glycolate, propionate, and formate anions provides water-soluble polymers having surprisingly lower resistivities than those having halogen anions with outstanding increase in efficiency of the polymers when incorporated in coatings on support elements, whether paper, glass, plastic or the like, of reproductive articles.

The water-soluble linear polymers of the present invention may have molecular weights in the range of about 10,000 to 2,000,000 or more and may be made by the direct polymerization of aminoalkyl esters of acrylic or methacrylic acid, or their salts with acetic, lactic, glycolic, propionic, or formic acid, to form a homopolymer of any one of them or a copolymer of any two or more thereof, and then quaternizing 75 to 100 percent of the amine-containing units with ethylene oxide. When the amine itself is polymerized, it is necessary to neutralize at least 75 mole percent, and preferably all, of the amine groups in the polymer before or after quaternization, by addition of formic, acetic, lactic, propionic or glycolic acid. The quaternization of the amine may cause some hydrolysis of the amine units, such as DMAEMA units to methacrylic acid units. The quaternized polymers may have molecular weights of about 20,000 to 2,000,000 or more. Specific examples are the polymers of dimethylaminoethyl acrylate and methacrylate (which is preferred), diethylaminoethyl acrylate and methacrylate, 3-dimethylaminopropyl or 3-diethylaminopropyl acrylate and methacrylate and 2-dimethylaminoisopropyl acrylate and methacrylate and their salts with acetic, lactic, glycolic, propionic or formic acid which are quaternized with ethylene oxide or propylene oxide. In all these cases, the proportions of monomers are so selected as to provide a polymer containing at least 75 mole percent of the salt of the alkylene oxide-quaternized aminoalkyl ester of acrylic acid or methacrylic acid and preferably 90 mole percent to 100 mole percent thereof in the copolymer molecule.

Alternatively the conductivity aids of the present invention may be prepared by first forming a monomer containing quaternary ammonium groups and having the formula:

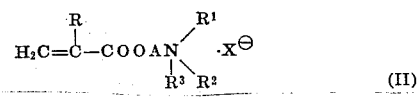

(II)

by reacting a salt of an amino-containing monomer with acetic, lactic, glycolic, propionic or formic acid, of the formula

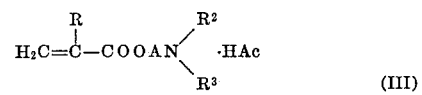

(III)

(wherein the substituents are as defined above and HAc represents one of the carboxylic acids specified) with ethylene oxide to quaternize 75 to 100 percent of it. Then the resulting monomer or monomer mixture may be polymerized to form a homopolymer or a copolymer containing up to 25 mole percent of the unquaternized dialkylaminoalkyl ester units.

When polymers in the lower molecular weight range are desired, the polymerization of the salt of the amine with acetic, lactic, glycolic, propionic or formic acid, or its quaternary having one of these anions may be effected at elevated temperatures, e.g. 40° to 60°C. or higher using conventional initiator systems, such as ammonium persulfate with or without sodium hydrosulfite. The higher molecular weight polymers may be obtained at lower temperatures, such as 5° to 10°C. and using concentrations of 60 percent or more with dilution to facilitate handling as polymerization progresses.

The amine-containing monomer or polymer may be alkylated, as with ethylene oxide by introducing, with the necessary autogenous pressure, an equivalent quantity (or excess thereof) of the oxide into a closed vessel containing a solution of the monomer or polymer at a temperature of 35° to 50°C. over a period of several hours.

Preparation of the polymers used in the present invention is illustrated by the following procedure:

Example A

1. Charge a reactor with:
   800 g. deionized water
   234 g. glacial acetic acid
   5 p.p.m. $Fe^{++}$ (as ferrous sulfate)
2. Sparge with nitrogen for ½ hour; heat to 60°C.
3. To this system, three feeds are uniformly added, beginning at the same time:
   a. 5.78 g. sodium metabisulfite in 200 g. deionized water over a 3-hour period.
   b. 5.78 g. ammonium persulfate in 200 g. deionized water over a 3-hour period.
   c. 578 g. dimethylaminoethyl methacrylate (DMAEMA) over a 2-hour period.

4. The entire reaction is run at 60°C. under nitrogen.

5. Hold the reaction mixture at the end of the three-hour period under (3) for an additional ½ hour while the mixture cools to 45°C. At this point, the mixture contains 40 percent non-volatile solids and has a viscosity of 1,300 cps. (Brookfield, at R.T.).

6. To this solution 4.8 equivalents of ethylene oxide (EO) are added at atmospheric pressure. The EO is bubble into the solution as a gas over a period of 3–4 hours while temperature is held at 45°C.

7. Excess EO is sparged out of the reactor with an air stream. At this point the solution contains 47 percent non-volatile solids and has a viscosity of 3800 cps. (Brookfield, at R. T.).

The product is 100 percent quaternized i.e., poly(hydroxyethyl(methacryloxyethyl)dimethylammonium acetate). No detectible amine, i.e., DMAEMA, residues are found. No detectible acid, i.e., methacrylic acid (MAA via hydrolysis of DMAEMA), residues are found by titration. The estimated molecular weight is about 50,000 viscosity average. The presence of the acid in charge (1) above prevents hydrolysis of the DMAEMA to form MAA units in the polymer.

EXAMPLE B

The procedure of Example A is repeated replacing the 234 g. of glacial acetic acid with a respective one of the following:
   a. 351.3 g. of lactic acid.
   b. 296.6 g. of glycolic acid.
   c. 179.7 g. of formic acid.
   d. 287 g. of propionic acid.

In each case the polymer obtained is essentially a homopolymer of the same composition as the product of Example A except the acetate ion is replaced by a lactate, glycolate, formate, and propionate anion respectively.

Analogous products are obtained when the ethylene oxide used in Examples A and B is replaced by 4.8 equivalents of propylene oxide.

While the water-soluble quaternary ammonium polymer of the present invention may be applied to paper or other support without additional materials nevertheless it is frequently desirable to apply the water-soluble polymer along with an inert filler or pigment and a compatible latex polymer as an auxiliary binder. The purpose for the use of such filler or pigment is to reduce the tendency of the coated paper to block which may not always be necessary but for many purposes is desirable. The auxiliary binder is not absolutely necessary but in certain situations it may be desirable, particularly to eliminate the tendency of the electroconductive layer to be lifted when a topcoating of the photoconductive zinc oxide or other photoconductive material is applied over the quaternary polymer-containing layer. Such zinc oxide-containing coatings are generally lacquers containing such organic solvents as toluene, xylene and the like and the auxiliary binder aids in reducing or preventing the removal of the quaternary ammonium salt by the organic solvent of the topcoating when the latter is applied.

When a filler is used in conjunction with the water-soluble polymer of the present invention for application to paper or other substrate, the amount of filler or pigment may be from 25 to 200 parts by weight for each 100 parts by weight of the quaternary ammonium polymer. Examples of this filler or pigment are clay, titanium dioxide, copper phthalocyanine, barytes and the like.

When, in addition to the water soluble quaternary polymer and the filler, an auxiliary binder is employed, it should be a polymer dispersion in the form of a latex which is of nonionic or cationic character. It may contain anionic emulsifiers or have a small amount of acid in the dispersed polymer of the latex provided it is stabilized adequately with a non-ionic emulsifier or dispersing agent. The auxiliary binder may be used in an amount from about 20 parts to 100 parts by weight thereof per 100 parts by weight of the quaternary ammonium polymer.

The polymer that may be used in the latex as an auxiliary binder is preferably a copolymer of acrylic acid esters or methacrylic acid esters such as methyl acrylate, ethyl acrylate, butyl acrylate, 2-ethylhexyl acrylate, methyl methacrylate, ethyl methacrylate and butyl methacrylate. The copolymers may also comprise up to 30 percent by weight in the co-polymer of acrylonitrile, styrene, vinyltoluene, vinyl acetate, vinyl chloride or vinylidene chloride. The amount of the methacrylates and of the last-named comonomers preferably do not exceed the amount that would impart an apparent second order transition temperature, $T_i$, of over 30°C. Preferably, the $T_i$ is not over 20°C. Besides the acrylic acid ester components there may be from about ½ to 8 percent by weight of various comonomers that have functional groups such as hydroxyl, amino, amido, or ureido groups. Examples are hydroxyethyl acrylate or methacrylate, dimethylaminoethyl acrylate or methacrylate, acrylamide, methacrylamide, ureidoethyl acrylate or methacrylate. The copolymers may also contain small amounts up to about 2½ percent by weight of an acid such as acrylic acid, methacrylic acid or itaconic acid.

The $T_i$ value referred to is the transition temperature or inflection temperature which is found by plotting the modulus of rigidity against temperature. A convenient method for determining modulus of rigidity and transition temperature is described by I. Williamson, British Plastics 23, 87–90, 102 (September 1950). The $T_i$ value here used is that determined at 300 kg./cm.$^2$.

To prepare an electroconductive paper, the N-hydroxy-alkyl quaternary ammonium polymer salts hereinabove defined may be applied to paper or other substrate by the conventional methods used for that purpose, e.g. coating, dipping, brushing, or by wet end addition, etc. The amount of such polymer salt applied to the paper will generally vary within the range of about 1 to 8 percent (weight) pickup dry polymer on dry fiber weight, depending upon the particular polymer and paper combination used and the degree of electroconductivity which is desired. In some cases, still less might be used. There seems to be no operative upper limit to the amount of polymer applied, except to the extent this is determined by economics. It will therefore be appreciated and understood that the overall range of from about 1 percent to about 8 percent pickup (by weight) is simply a statement of the required amount of polymer to confer electroconductivity properties to the cellulosic web substrate which will adapt it to most commercial uses mentioned above. Expressed in another way, the amount of the quaternary salt polymer deposited should be from about ½ to about 1½ pounds per 500 sheets of 2-ft. × 3-ft. size when the basis weight of the paper is from 20 to 60 lbs. (which is the weight of 500 sheets of 2-ft. × 3-ft. size).

The quaternary salt copolymers of the present invention may be modified having up to 25 percent of the quaternary ammonium groups in the form of other salts. For example, 75 percent or more of such groups may be in the form of a salt having one of the acetate, formate, glycolate, propionate, or lactate ions and the remainder may be in the form of one or more ions such as chloride, bromide, oxalate, nitrate or the like. Alternatively the electroconductive elements of the present invention may contain mixtures of a polymer of the quaternary ammonium salts of the present invention as defined herein with other polymers that serve as conductivity aids. The polymer of the present invention should constitute at least about 70 percent by weight of the entire mixture of quaternary ammonium polymers. Examples of other quaternary ammonium polymers that may be mixed with the polymers of the present invention include those described in U.S. Pat. No. 3,011,918 and 3,288,770. However, the polymers of the present invention generally provide better efficiency in their action in such reproductive elements when used as the only electroconductivity aid than is obtained when mixtures of quaternary ammonium polymers of the present invention with quaternary ammonium polymers of the prior art are used.

Coatings of each of the several polymers produced in Examples A and B are cast on glass plates to provide on drying films of the copolymers having a thickness of 0.6 mils. After drying the electrical resistivity of the coated plates is measured at room temperature and 15 percent relative humidity after storing for 16 hours at 15 percent relative humidity. The resistivity is measured with Keithley high voltage supply Model 240–A and the Keithley Resistivity Adapter, Model 6105 using an applied potential of 100 volts. The following table gives the comparative values of film conductivity in terms of the log (surface resistivity).

| Quaternary Counterion | Log Resistivity |
| --- | --- |
| Acetate | 8.5 |
| Glycolate | 8.4 |
| Lactate | 9.2 |
| Formate | 8.7 |
| Chloride * | 9.9 |

* This polymer is prepared as described in Example A except an equal number of equivalents of hydrochloric acid is used in place of the acetic acid.

The following examples are illustrative of the preparation of electroconductive papers of the present invention.

EXAMPLE 1

Separate sheets of a 40-pound bleached sulfite paper made from pulp beaten to a 450 ml. Canadian Standard Freeness are dipped into dilute solutions of the polymers of Examples A and B containing about 25 weight percent of the respective polymers and then passed through squeeze rolls and dried to obtain conductive paper sheets with various amounts of the respective polymer to serve as a conductivity aid. The amount of polymer applied is 1 percent, 2 percent, 3 percent, 5 percent and 8 percent by weight, based on the weight of the paper. All these treated papers are suitable in conventional electrostatic photocopying equipment.

EXAMPLE 2

14.3 parts by weight of a 70 percent clay slurry (aqueous) having a pH of 9, 5.6 parts by weight of a 44 percent solids latex of a poly(ethyl acrylate) containing a nonionic dispersant (t-octylphenoxypoly(40)ethoxyethanol), 22.7 parts by weight of a 44 percent aqueous solution of the quaternary polymer of Example A, and 32.4 parts by weight of water are mixed together thoroughly. The mixture has a pH of about 6. A 10 percent aqueous sodium hydroxide solution is added to adjust the pH to 9. The mixture has 30 percent non-volatile solids and a viscosity (Brookfield) of about 50 cps at room temperature.

This composition is coated on paper of 40-pound basis weight at a level to provide, in the dried coated paper, a weight of 2 percent, based on dry fiber weight, of the quaternary polymer.

The coating on the paper is then topcoated with a toluene solution containing 15 weight percent of poly(methyl methacrylate) and 75 weight percent of photoconductive ZnO. The resulting paper is suitable for electrostatic reproduction of printed documents.

EXAMPLE 3

The procedure of Example 2 is repeated with each of the quaternary polymers of Example B used in place of that of Example A. The resulting papers are suitable for reproductive purposes.

EXAMPLE 4

The procedures of Examples 2 and 3 are repeated except the poly(ethyl acrylate) latex was replaced by 5.4 parts by weight of an aqueous dispersion containing 46 percent weight of a copolymer of about 71 percent ethyl acrylate, 24 percent methyl methacrylate, and about 5 percent of oxazolidinylethyl methacrylate. The resulting papers are suitable for reproductive purposes.

What is claimed is:

1. An electroconductive paper having incorporated thereon a continuous coating containing, as the essential electroconductive component thereof, from about 1 to 8 weight percent on paper of a water-soluble linear cationic polymer having at least 75 mole percent up to 100 mole percent of units of the formula:

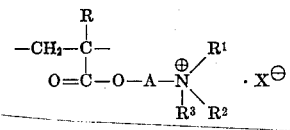

wherein
R stands for hydrogen or methyl;
$R^1$ represents a hydroxypropyl or hydroxyethyl group;
A represents a $(C_2-C_3)$-alkylene group;
$R^2$ stands for a $(C_1-C_4)$-alkyl group;
$R^3$ stands for a $(C_1-C_4)$-alkyl group; and
X is selected from acetate, formate, lactate, propionate and glycolate anions.

2. The coated paper of claim 1, wherein the polymer contains units of the formula:

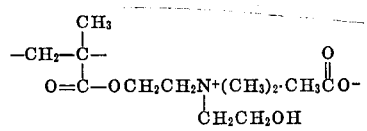
3. The coated paper of claim 2, wherein the polymer is a homopolymer.
* * * * *